United States Patent
Lin et al.

(10) Patent No.: US 9,459,500 B2
(45) Date of Patent: Oct. 4, 2016

(54) LIQUID CRYSTAL ON SILICON PANELS AND ASSOCIATED METHODS

(71) Applicant: OmniVision Technologies, Inc., Santa Clara, CA (US)

(72) Inventors: Wei-Feng Lin, HsinChu (TW); Chun-Sheng Fan, HsinChu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 130 days.

(21) Appl. No.: 14/616,900

(22) Filed: Feb. 9, 2015

(65) Prior Publication Data

US 2016/0231604 A1  Aug. 11, 2016

(51) Int. Cl.
  *G02F 1/1343*  (2006.01)
  *G02F 1/1345*  (2006.01)
  *G02F 1/1337*  (2006.01)
  *G02F 1/1333*  (2006.01)

(52) U.S. Cl.
  CPC ......... *G02F 1/1345* (2013.01); *G02F 1/13439* (2013.01); *G02F 1/133723* (2013.01); *G02F 2001/133302* (2013.01)

(58) Field of Classification Search
  CPC .................................................. G02F 1/13439
  See application file for complete search history.

(56) References Cited

U.S. PATENT DOCUMENTS 7,808,573 B2  10/2010  Chen et al.
8,885,127 B2*  11/2014  Kanzaki ............... H01L 33/005
  349/122
2010/0072481 A1*  3/2010  Xiang ............... G02F 1/133553
  257/72
2013/0070326 A1*  3/2013  Frisken ............... H04L 27/2096
  359/279
2014/0375909 A1*  12/2014  Misaki .................... G06F 3/044
  349/12

OTHER PUBLICATIONS

Bashar, "Study of Indium Tin Oxide (ITO) for Novel Optoelectronic Devices", University of London, Department of Electronic Engineering, 1998, 278 pp.
Zhang, et al., "Fundamentals of phase-only liquid crystal on silicon (LCOS) devices", Light: Science & Applications (2014) 3, e213; doi:10.1038/Isa2014.94, 1-10.

* cited by examiner

*Primary Examiner* — Timothy L Rude
(74) *Attorney, Agent, or Firm* — Lathrop & Gage LLP

(57) ABSTRACT

A liquid crystal on silicon (LCOS) panel is provided that includes an electrical contact layer deposited in a pattern on a portion of a transparent conductive layer. An alignment layer protects the conductive layer and electrical contact layer during LCOS panel assembly. The alignment layer is etched away to expose the electrical contact, which protects the underlying conductive layer from the etching process. The resulting LCOS panel has more reliably formed electrical contacts for improved stability of electrical connections to the conductive layer. A method for forming an electrical contact layer on a conductive layer of a LCOS panel includes steps for depositing a patterned layer on a portion of the conductive layer. The method is compatible with microfabrication techniques for scalable manufacturing. The resulting LCOS panel includes a pattern of one or more electrical contacts exposed on a portion of the conductive layer.

19 Claims, 6 Drawing Sheets

LIQUID CRYSTAL ON SILICON PANELS AND ASSOCIATED METHODS

BACKGROUND

This invention relates to the manufacture of optoelectronic devices such as liquid-crystal-on-silicon (LCOS) displays, and particularly, improved electrical contacts and improved methods of forming electrical contacts within these devices.

LCOS displays are used in consumer electronics, such as hand-held projectors and near-eye displays, and also have applications in optical communications technologies. LCOS displays include a LCOS panel that contains a transparent conductive layer. Conventional LCOS panels use solder as a means to electrically connect a printed circuit board to the transparent conductive layer, with the solder being applied manually. Soldered electrical contacts provide unreliable electrical connections and their manual application is slow and labor-intensive.

SUMMARY OF THE INVENTION

In an embodiment, a liquid crystal on silicon (LCOS) panel is provided that includes a glass substrate, a transparent conductive layer on the glass substrate, and a patterned electrical contact layer on a portion of the transparent conductive layer. The electrical contact layer is formed of a different material than the transparent conductive layer on a portion of the transparent conductive layer opposite of the glass substrate. The LCOS panel further includes an integrated circuit (IC) driver chip mounted on a printed circuit board (PCB), a liquid crystal layer between the transparent conductive layer and the IC driver chip, a pixel array on the IC driver chip, and an electrical connection between the patterned electrical contact layer and the printed circuit board.

In an embodiment, a method for forming a LCOS panel is provided. The method includes steps for depositing an electrical contact layer on a portion of a transparent conductive layer supported by a glass substrate. The method further includes steps for depositing a protective layer on the electrical contact layer and the transparent conductive layer, assembling a liquid crystal layer and an integrated circuit (IC) driver chip on the protective layer, and for removing a portion of the protective layer to expose the electrical contact layer.

DETAILED DESCRIPTION

Figure 1:
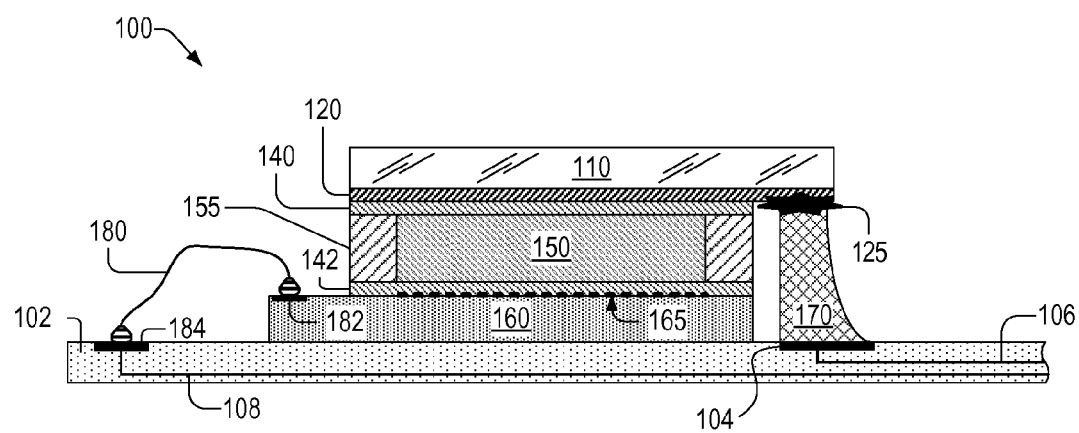
FIG. 1 is a cross-sectional view showing a prior-art liquid crystal on silicon (LCOS) panel.

FIG. 1 is a cross-sectional view showing a prior-art liquid crystal on silicon (LCOS) panel 100. LCOS panel 100 includes a cover glass 110 on a semiconductor wafer 160. Semiconductor wafer 160 is for example formed of silicon. A liquid crystal layer 150 is between cover glass 110 and semiconductor wafer 160. Dam 155 contains liquid crystal layer 150. A pixel array 165 is located on a surface of semiconductor wafer 160 facing liquid crystal layer 150. Semiconductor wafer 160 includes a plurality of bond pads, such as bond pad 182, for electrically connecting each pixel of pixel array 165.

A transparent conductive layer 120 is on the surface of cover glass 110. Transparent conductive layer 120 is formed of indium titanium oxide (ITO), for example. A first alignment layer 140 covers the surface of transparent conductive layer 120 and is adjacent to liquid crystal layer 150. A second alignment layer 142 is between liquid crystal layer 150 and semiconductor wafer 160. First and second alignment layers 140, 142 are for example polyimide films that align liquid crystals within liquid crystal layer 150.

LCOS panel 100 is mounted on a printed circuit board (PCB) 102. PCB 102 is for example a flexible printed circuit assembly. PCB 102 contains a first conductive pad 104 electrically connected to a first conductive trace 106 and a second conductive pad 184 electrically connected to a second conductive trace 108. Transparent conductive layer 120 is electrically connected to PCB 102 by a solder layer 125 and conductive glue 170 connected to conductive pad 104. Semiconductor wafer 160 is electrically connected to PCB 102 via a plurality of wire bonds, such as a wire bond 180.

Solder layer 125 is typically formed of an alloy of tin-indium. Soldering of layer 125 is performed using manual ultrasonic soldering techniques for example. Solder layer 125 has two deficiencies. The first is that solder layer 125 does not reliably form a stable electrical connection between transparent conductive layer 120 and conductive glue 170. The second is that manually forming solder layer 125 is slow and not easily scalable for high-volume device microfabrication. As a metal oxide, transparent conductive layer 120 has a high interface impedance with conductive glue 170. Thus, the alloy material of solder layer 125 is necessary to maintain a low interface impedance for electrically connecting transparent conductive layer 120 to conductive glue 170.

Disclosed herein are systems and methods for a patterned electrical contact layer of a LCOS panel that replace solder layer 125 and its associated manual soldering technique. The methods are compatible with microfabrication techniques for scalable manufacturing and the resulting electrical contacts provide a reliable and stable electrical connection.

Figure 2:
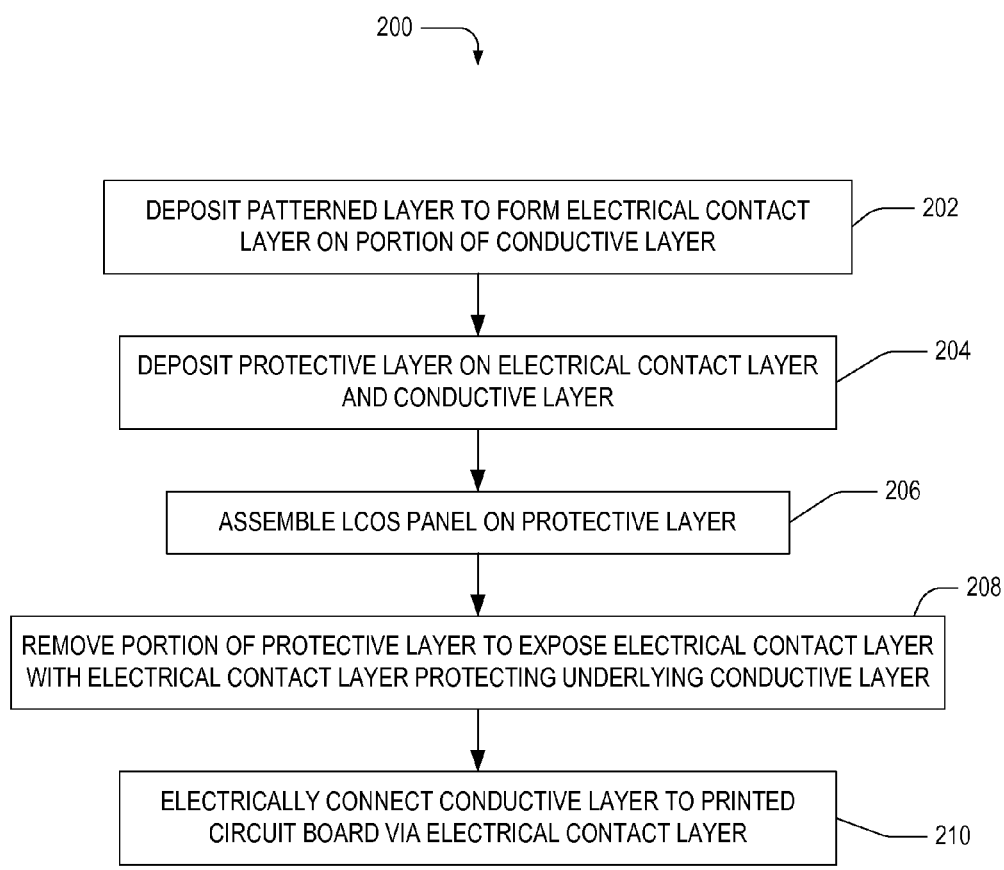
FIG. 2 is a flowchart illustrating one embodiment of a method for forming a liquid crystal on silicon panel (LCOS).
Figure 3:
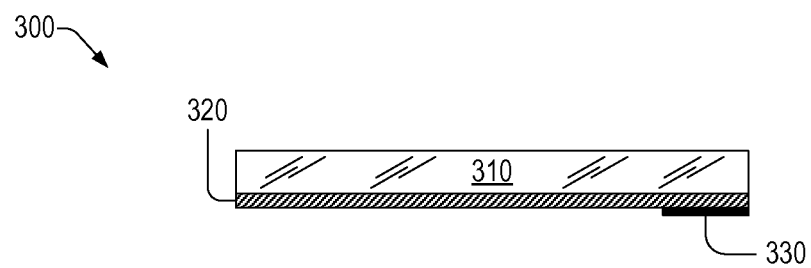
FIG. 3 is a cross-sectional view showing one embodiment of a partial LCOS panel during assembly.
Figure 4:
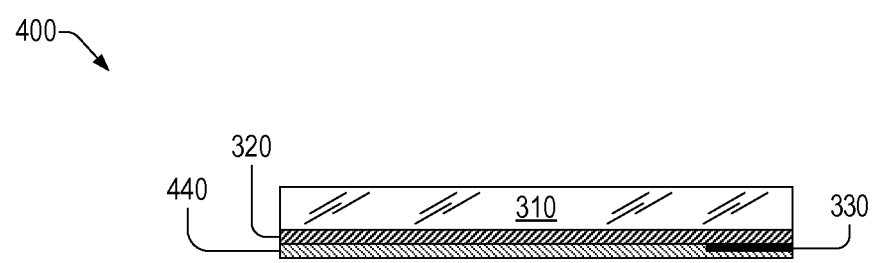
FIG. 4 is a cross-sectional view showing one embodiment of a partial LCOS panel during assembly.

FIG. 2 is a flowchart illustrating a method 200 for forming a LCOS panel. FIGS. 3-7 show cross-sectional views of exemplary LCOS panel components corresponding to steps of method 200. FIGS. 3-7 are best viewed with the following description. In step 202, method 200 deposits a patterned layer to form an electrical contact layer on a portion of a conductive layer. In an example of step 202, a patterned layer is deposited on a transparent conductive layer 320 opposite glass substrate 310 to form an electrical contact 330, as illustrated in FIG. 3. Electrical contact layer 330 is formed of a conductive material, such as at least one of titanium, titanium-tungsten, aluminum, chromium, silver, and copper, and has a thickness between twenty-five nanometers and one micron. Step 202 deposits a patterned layer using photolithographic techniques, for example. Transparent conductive layer 320 is for example made of indium tin oxide, which is applied to a cover glass 310.

In step 204, method 200 deposits a protective layer on the electrical contact layer and the conductive layer. In an example of step 204, a protective layer 440 is deposited on electrical contact layer 330 and transparent conductive layer 320. Protective layer 440 protects transparent conductive layer 320 and electrical contact layer 330 during further LCOS panel assembly.

In step 206, method 200 assembles LCOS panel components on the protective layer. In an example of step 206, LCOS panel components 501 of FIG. 5 are assembled on protective layer 440 of FIG. 4.

Figure 5:
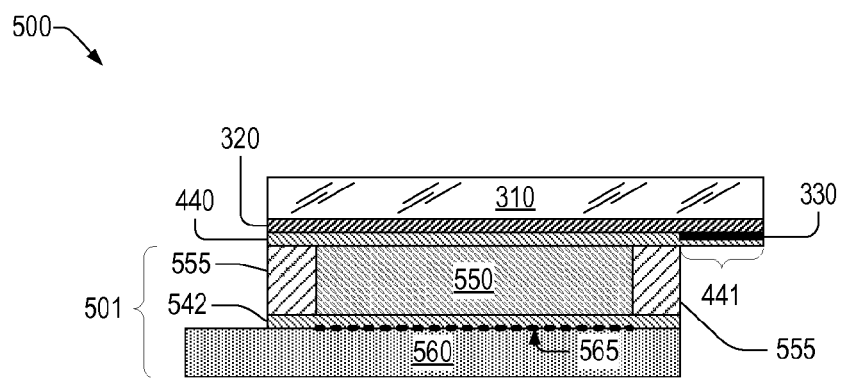
FIG. 5 is a cross-sectional view showing one embodiment of a LCOS panel during assembly.

FIG. 5 is a cross-sectional view showing an exemplary LCOS panel 500 with components 501 having been assembled on a first alignment layer 440 during step 206. First alignment layer 440 is an embodiment of protective layer 440 of FIG. 4. In an embodiment, first alignment layer 440 is a polyimide film configured to properly align liquid crystals for changing light polarization. First alignment layer 440 protects electrical contact layer 330 during LCOS panel assembly of step 206. Components 501 of LCOS panel 500 include a liquid crystal layer 550 and a semiconductor wafer 560. Semiconductor wafer 560 is for example formed of silicon. Dam 555 contains liquid crystal layer 550. A pixel array 565 is located on a surface of semiconductor wafer 560 facing liquid crystal layer 550. In an embodiment, semiconductor wafer 560 is an integrated circuit (IC) driver chip that electrically connects to individual pixels of pixel array 565. A second alignment layer 542 is located between semiconductor wafer 560 and liquid crystal layer 550 for aliging liquid crystals.

In step 208, method 200 removes a portion of the protective layer to expose one or more electrical contacts. In an example of step 208, a portion 441 of first alignment layer 440 of FIG. 5 is removed to expose electrical contact layer 330.

Figure 6:
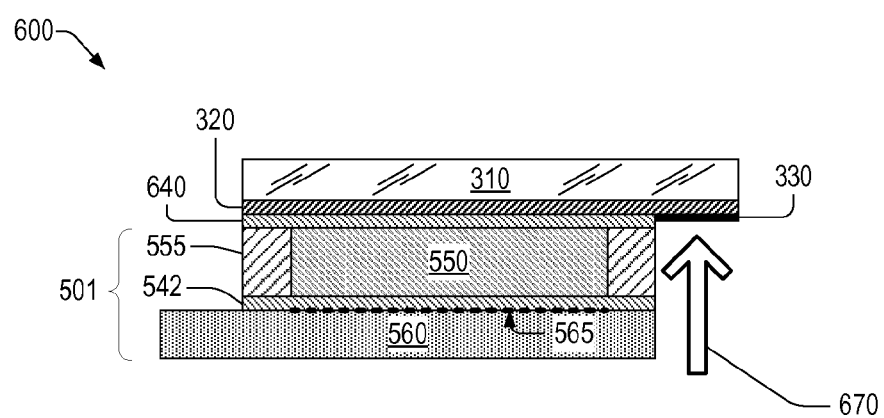
FIG. 6 is a cross-sectional view showing one embodiment of a LCOS panel with an exposed electrical contact layer.

FIG. 6 is a cross-sectional view showing an exemplary LCOS panel 600 with electrical contact layer 330 having been exposed during step 208. Step 208 removes portion 441 of first alignment layer 440 of FIG. 5 using wet chemical-etching or dry plasma-etching, for example. Arrow 670 of FIG. 6 points out the location where etching occurred in step 208 to form a modified first alignment layer 640 and expose electrical contact layer 330.

Both wet chemical-etching and dry plasma-etching may damage underlying transparent conductive layer 320. In an embodiment, etching of first alignment layer 440 of FIG. 5 changes the ratio of indium to tin within the indium-tin oxide of transparent conductive layer 320, which increases its electrical resistivity. During step 208, electrical contact layer 330 is resistant to plasma and chemicals used in etching processes. Thus, electrical contact layer 330 also serves as a stop layer to stop chemical or plasma penetration during etching, thereby protecting the underlying transparent conductive layer 320. The resulting exposed electrical contact layer 330 and the protected underlying transparent conductive layer 320 provide a reliable and stable electrical connection.

In step 210, method 200 electrically connects the conductive layer to a printed circuit board (PCB) or other device. The LCOS panel is for example die bonded onto the PCB and electrically connected to the PCB to form a LCOS panel device. In an example of step 210, method 200 forms an electrical connection 780 that electrically connects transparent conductive layer 320 to a PCB 702 of FIG. 7, which completes an electrical circuit with semiconductor wafer 560 and liquid crystal layer 550. Specifically, electrical connection 780 electrically connects transparent conductive layer 320 to a PCB 702 via electrical contact layer 330 and a first conductive pad 704, respectively. First conductive pad 704 is connected to a first conductive trace 706, for example. In an embodiment, electrical connection 780 is formed of conductive glue or epoxy.

Figure 7:
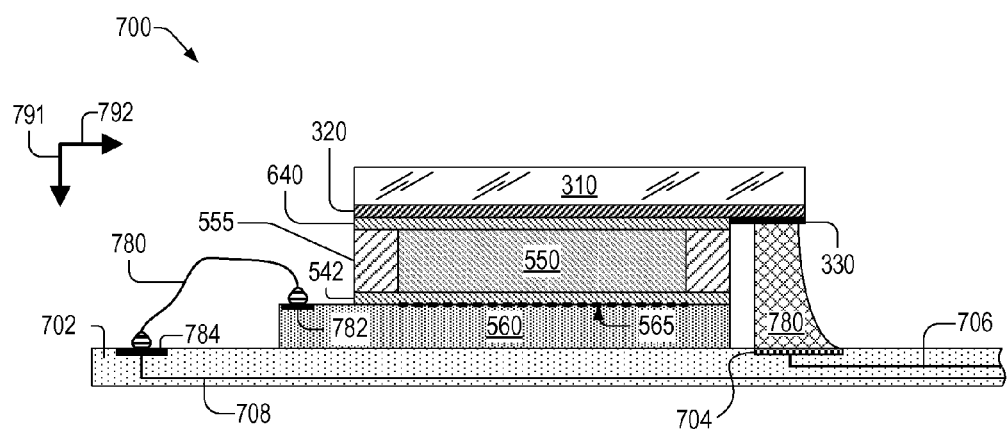
FIG. 7 is a cross-sectional view showing one embodiment of a LCOS panel with an electrical connection to a printed circuit board.

FIG. 7 shows additional components of LCOS panel 700 including a second conductive pad 784 electrically connected to a second conductive trace 708. Semiconductor wafer 560 is electrically connected to PCB 702 via a plurality of wire bonds, such as a wire bond 780. Semiconductor wafer 560 includes a plurality of bond pads, such as bond pad 782, that control each pixel of pixel array 565. An LCOS panel resulting from method 200, such as LCOS panel 700, includes first alignment layer 640 that protects transparent conductive layer 320 during LCOS panel assembly while exposing an electrical contact layer 330.

FIG. 7 includes arrows illustrating a first direction 791 orthogonal to a second direction 792. In an embodiment, the following layers of LCOS panel 700 are stacked in first direction 791: glass substrate 310, transparent conductive layer 320, first alignment layer 640, liquid crystal layer 550, second alignment layer 542, semiconductor wafer 560, and PCB 702. Additionally, glass substrate 310, transparent conductive layer 320, and patterned electrical contact layer 330 are also stacked in first direction 791. Patterned electrical contact layer 330 is adjacent to first alignment layer 640 in second direction 792.

Figure 8:
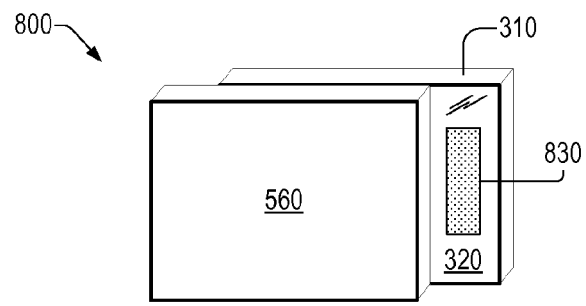
FIG. 8 shows a perspective view of one embodiment of a LCOS panel with a single deposited electrical contact.
Figure 9:
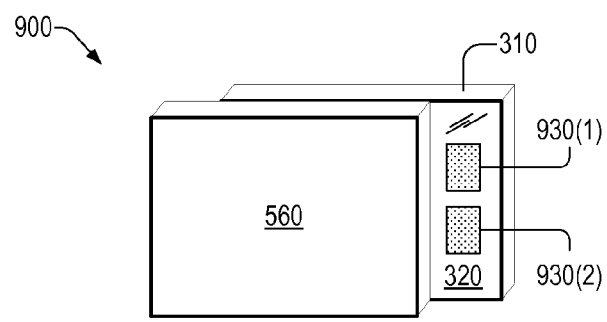
FIG. 9 shows a perspective view of one embodiment of a LCOS panel with a pair of deposited electrical contacts.
Figure 10:
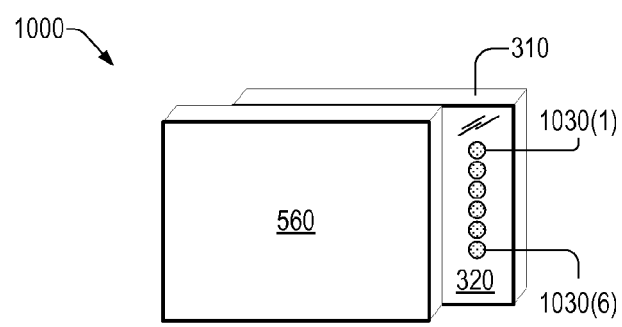
FIG. 10 shows a perspective view of one embodiment of a LCOS panel with six electrical contacts patterned as a line of circles.

FIGS. 8-10 show perspective views of example LCOS panels with semiconductor wafer 560 in front of cover glass 310. A portion of cover glass 310 overhangs semiconductor wafer 560 to provide space for electrically connecting to transparent conductive layer 320. Transparent conductive layer 320 is located on the surface of cover glass 310 facing semiconductor wafer 560. FIGS. 8-10 show exemplary patterns of electrical contacts 830, 930, and 1030, respectively, resulting from step 202 of method 200.

FIG. 8 shows a perspective view of an example LCOS panel 800 with a single patterned electrical contact 830 deposited as a thin layer during step 202 of method 200. Electrical contact 830 is patterned as a rectangle in FIG. 8 but may be patterned to form a layer of any arbitrary two-dimensional shape using photolithographic techniques without departing from the scope hereof.

FIG. 9 shows a perspective view of an example LCOS panel 900 with a pair of patterned electrical contacts 930(1), 930(2) deposited during step 202 of method 200. Electrical contacts 930(1), 930(2) are patterned as rectangles aligned lengthwise but may be patterned in alternate orientations using photolithographic techniques without departing from the scope hereof.

FIG. 10 shows a perspective view of an example LCOS panel 1000 with six patterned electrical contacts 1030(1-6) patterned as a line of circles. Only contacts 1030(1) and 1030(6) are denoted in FIG. 10 for clarity. Electrical contacts 1030(1-6) may be patterned in alternate orientations and in greater or fewer numbers using photolithographic techniques without departing from the scope hereof.

Patterned electrical contacts 830, 930, 1030 of FIGS. 8-10, respectively, replace solder layer 125 in prior art LCOS panel 100 of FIG. 1 to provide smaller, and more reliably stable, electrical connections to transparent conductive layer 320. Method 200 replaces the prior-art manual soldering technique to provide more accurate deposition of electrical contact materials. Another important advantage of method 200 is its compatibility with microfabrication techniques for manufacturing scalability.

Features described above as well as those claimed below may be combined in various ways without departing from the scope hereof. The following examples illustrate some possible, non-limiting combinations:

(A1) A liquid crystal on silicon (LCOS) panel may include a glass substrate, a transparent conductive layer on the glass substrate, and a patterned electrical contact layer, formed of a different material than the transparent conductive layer, on a portion of the transparent conductive layer opposite of the glass substrate. The LCOS panel may further include an integrated circuit (IC) driver chip mounted on a printed circuit board (PCB), a liquid crystal layer between the transparent conductive layer and the IC driver chip, a pixel array on the IC driver chip, and an electrical connection between the patterned electrical contact layer and the printed circuit board.

(A2) The LCOS panel denoted as (A1) may further include a first alignment layer between the transparent conductive layer and the liquid crystal layer and a second alignment layer between the liquid crystal layer and the IC driver chip.

(A3) In either of the LCOS panels denoted as (A1) or (A2), the electrical connection may include conductive glue.

(A4) In either of the LCOS panels denoted as (A2) or (A3), the glass substrate, the transparent conductive layer, the first alignment layer, the liquid crystal layer, the second alignment layer, the IC driver chip, and the PCB may be stacked in a first direction. Furthermore, the glass substrate, the transparent conductive layer, and the patterned electrical contact layer are stacked in the first direction.

(A5) In the LCOS panel denoted as (A4), the patterned electrical contact layer may be adjacent to the first alignment layer in a second direction, orthogonal to the first direction.

(A6) In either of the LCOS panels denoted as (A4) or (A5), the conductive glue may electrically couple the patterned electrical contact layer to the PCB, in the first direction.

(A7) In any of the LCOS panels denoted as (A2) through (A6), the first alignment layer may not cover at least a portion of the patterned electrical contact layer, in the first direction.

(A8) In any of the LCOS panels denoted as (A2) through (A7), each of the first and second alignment layers may include polyimide film.

(A9) In any of the LCOS panels denoted as (A1) through (A8), the transparent conductive layer may include indium tin oxide.

(A10) In any of the LCOS panels denoted as (A1) through (A9), the patterned electrical contact layer may include a plurality of noncontiguous electrical contacts.

(A11) In any of the LCOS panels denoted as (A1) through (A10), the patterned electrical contact layer may have a thickness less than one micron and may include at least one of titanium, titanium-tungsten, aluminum, chromium, silver, and copper (B1) A method for forming a LCOS panel may include depositing an electrical contact layer on a portion of a transparent conductive layer supported by a glass substrate, depositing a protective layer on the electrical contact layer and the transparent conductive layer, assembling a liquid crystal layer and an integrated circuit (IC) driver chip on the protective layer, and removing a portion of the protective layer to expose the electrical contact layer.

(B2) The method denoted as (B1) may further include electrically coupling the electrical contact layer to a printed circuit board using conductive glue, after the step of removing.

(B3) In either of the methods denoted as (B1) or (B2), the step of depositing the electrical contact layer may further include layering at least one of titanium, titanium-tungsten, aluminum, chromium, silver, and copper on the transparent conductive layer.

(B4) Any of the methods denoted as (B1) through (B3), the step of depositing the electrical contact layer may further include patterning the electrical contact layer on the transparent conductive layer using a photolithographic technique.

(B5) In any of the methods denoted as (B1) or (B2), the step of removing may include plasma-etching a portion of the protective layer to expose the electrical contact layer.

(B6) In the method denoted as (B5), the step of removing may further include using the electrical contact layer to stop plasma from contacting the transparent conductive layer, during the step of plasma-etching.

(B7) In the method denoted as (B1) or (B2), the step of removing may include chemical-etching a portion of the protective layer to expose the electrical contact layer.

(B8) In the method denoted as (B7), the step of removing may further include using the electrical contact layer to stop chemicals from contacting the transparent conductive layer, during the step of chemical-etching.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present methods and systems, which, as a matter of language, might be said to fall therebetween.

What is claimed is:

1. A liquid crystal on silicon (LCOS) panel, comprising:
   a glass substrate;
   a transparent conductive layer on the glass substrate;
   a patterned electrical contact layer, formed of a different material than the transparent conductive layer, on a portion of the transparent conductive layer opposite of the glass substrate;
   a printed circuit board (PCB);
   an integrated circuit (IC) driver chip on the PCB;
   a liquid crystal layer between the transparent conductive layer and the IC driver chip;
   a pixel array on a surface of the IC driver chip facing the liquid crystal layer; and
   an electrical connection between the patterned electrical contact layer and the printed circuit board.

2. The LCOS panel of claim 1, further comprising:
   a first alignment layer between the transparent conductive layer and the liquid crystal layer; and
   a second alignment layer between the liquid crystal layer and the IC driver chip.

3. The LCOS panel of claim 2, the electrical connection comprising conductive glue.

4. The LCOS panel of claim 2, wherein:
   the glass substrate, the transparent conductive layer, the first alignment layer, the liquid crystal layer, the second alignment layer, the IC driver chip, and the PCB are stacked in a first direction; and the glass substrate, the transparent conductive layer, and the patterned electrical contact layer are stacked in the first direction.

5. The LCOS panel of claim 4, the patterned electrical contact layer being adjacent to the first alignment layer in a second direction, orthogonal to the first direction.

6. The LCOS panel of claim 5, the conductive glue electrically coupling the patterned electrical contact layer to the PCB, in the first direction.

7. The LCOS panel of claim 4, the first alignment layer not covering at least a portion of the patterned electrical contact layer, in the first direction.

8. The LCOS panel of claim 2, each of the first and second alignment layers comprising polyimide film.

9. The LCOS panel of claim 1, the transparent conductive layer comprising indium tin oxide.

10. The LCOS panel of claim 1, the patterned electrical contact layer including a plurality of noncontiguous electrical contacts.

11. The LCOS panel of claim 1, the patterned electrical contact layer having a thickness less than one micron and comprising at least one of titanium, titanium-tungsten, aluminum, chromium, silver, and copper.

12. A method for forming a LCOS panel, comprising:
depositing an electrical contact layer on a portion of a transparent conductive layer supported by a glass substrate;
depositing a protective layer on the electrical contact layer and the transparent conductive layer;
assembling a liquid crystal layer and an integrated circuit (IC) driver chip on the protective layer; and
removing a portion of the protective layer to expose the electrical contact layer.

13. The method of claim 12, further comprising electrically coupling the electrical contact layer to a printed circuit board using conductive glue, after the step of removing.

14. The method of claim 12, the step of depositing the electrical contact layer comprising layering at least one of titanium, titanium-tungsten, aluminum, chromium, silver, and copper on the transparent conductive layer.

15. The method of claim 12, the step of depositing the electrical contact layer comprising patterning the electrical contact layer on the transparent conductive layer using a photolithographic technique.

16. The method of claim 12, the step of removing comprising plasma-etching a portion of the protective layer to expose the electrical contact layer.

17. The method of claim 16, the step of removing further comprising using the electrical contact layer to stop plasma from contacting the transparent conductive layer, during the step of plasma-etching.

18. The method of claim 12, the step of removing comprising chemical-etching a portion of the protective layer to expose the electrical contact layer.

19. The method of claim 18, the step of removing further comprising using the electrical contact layer to stop chemicals from contacting the transparent conductive layer, during the step of chemical-etching.

* * * * *